US008057183B1

(12) United States Patent
Liang

(10) Patent No.: US 8,057,183 B1
(45) Date of Patent: Nov. 15, 2011

(54) LIGHT WEIGHT AND HIGHLY COOLED TURBINE BLADE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 519 days.

(21) Appl. No.: 12/335,569

(22) Filed: Dec. 16, 2008

(51) Int. Cl.

| | |
|---|---|
| ***F01D 5/08*** | (2006.01) |
| ***F01D 5/20*** | (2006.01) |
| ***F01D 5/18*** | (2006.01) |
| ***B63H 1/14*** | (2006.01) |
| ***B63H 7/02*** | (2006.01) |
| ***B64C 11/00*** | (2006.01) |
| ***F03D 11/02*** | (2006.01) |
| ***F04D 29/58*** | (2006.01) |

(52) U.S. Cl. .................................... 416/97 R; 416/96 A

(58) Field of Classification Search ................ 416/97 R, 416/96 A
See application file for complete search history.

(56) References Cited

U.S. PATENT DOCUMENTS 5,484,257 A * 1/1996 Osborn .......................... 415/2.1
5,690,472 A * 11/1997 Lee ............................. 416/97 R
5,720,431 A * 2/1998 Sellers et al. ............... 416/97 R
5,813,835 A * 9/1998 Corsmeier et al. .......... 416/97 R

* cited by examiner

*Primary Examiner* — David Zarneke
(74) *Attorney, Agent, or Firm* — John Ryznic

(57) ABSTRACT

A turbine rotor blade formed from a main support spar and having a thin thermal skin bonded or formed to the support spar to form the outer airfoil surface of the blade. The main support spar is formed from a plurality of ribs arranged to form a cooling air supply cavity near the leading edge region, a plurality of impingement chambers and a plurality of spent air collector chambers arranged along the pressure side and suction side of the airfoil to form a series of impingement chambers and collector chambers to provide near wall cooling for the thermal skin. A row of exit cooling holes located along the trailing edge discharges the cooling air from the last collector chamber. In another embodiment, some of the collector chambers are connected to rows of film cooling air to discharge film cooling onto the outer airfoil surface. The thermal skin includes micro pin fins on the inner wall to enhance the cooling effect of the impinging cooling air. The entire blade comprises a spar support structure, a thin thermal skin, external coating formed using a metal molecular depositing process to build up the blade as a single piece but with multiple material.

22 Claims, 4 Drawing Sheets

LIGHT WEIGHT AND HIGHLY COOLED TURBINE BLADE

FEDERAL RESEARCH STATEMENT

None.

CROSS-REFERENCE TO RELATED APPLICATIONS

None.

BACKGROUND OF THE INVENTION

1. Field of the Invention

The present invention relates generally to a gas turbine engine, and more specifically to a light weight and highly cooled turbine rotor blade.

2. Description of the Related Art Including Information Disclosed Under 37 CFR 1.97 and 1.98

A gas turbine engine includes a turbine section in which a very high temperature gas flow passes through multiple rows or stages of rotor blades to drive the rotor shaft and other parts of the engine or, in the case of an industrial gas turbine engine, an electric generator to produce electrical power. Engine designers are constantly seeking ways to improve the engine performance, such as increasing the turbine inlet temperature (TIT) or providing more advanced airfoil cooling and preferably with less cooling air flow. Improved materials can also be used to allow for greater temperature exposure of the engine parts exposed to higher temperatures such as the airfoils in the stator vanes and rotor blades.

Current prior art rotor blades and stator vanes are formed as a single piece with the internal cooling passages formed into the airfoil. The investment, casting process is used to produce, for example, a turbine rotor blade from a nickel based super-alloy in which the internal serpentine flow cooling circuit is formed by a core that is leached out during the manufacturing process. Film cooling holes are then drilled into the airfoil surface to provide for the discharge of film cooling air to provide additional cooling protection to the airfoil. This type of blade can be very heavy and expensive to produce. The investment casting process for a turbine airfoil results in a large number of defective castings because of the very fine and small internal cooling passages required in the airfoil. These passages are formed by the ceramic cores, and these small and fine ceramic cores often break during handling or the casting process. When a blade is cast, the molten metal forms the passages around the ceramic core. If a piece in the core that represents a cooling passage is broken, then the passage that forms around the metal will be incomplete or not even connected.

BRIEF SUMMARY OF THE INVENTION

It is an object of the present invention to provide for a turbine rotor blade with a light weight construction.

It is another object of the present invention to provide for a turbine rotor blade with a reduced cooling flow requirement.

It is another object of the present invention to provide for a turbine rotor blade with a greatly reduced airfoil through-wall thermal gradient and metal temperature.

It is another object of the present invention to provide for a turbine airfoil with a thin shell, in which the airfoil is made of a single piece but with multiple materials.

The turbine blade of the present invention includes a main support spar with an array of ribs that form a series of cooling air supply cavity and spent air collector chambers extending from the leading edge region to the trailing edge region, and ribs that form a series of, impingement modules or chambers along the pressure side wall and the suction side wall. A thin walled thermal skin having micro pin fins formed on the inner surface is bonded to the support spar to form the airfoil surface of the rotor blade and to enclose the impingement chambers. The main support spar provides for the main support structure for the thermal skin and the cooling air supply and impingement passages extending through the blade. A leading edge impingement chamber is formed in the leading edge of the blade and a row of trailing edge exit cooling holes are formed on the trailing edge to provide cooling for these parts. In another embodiment, film cooling holes are formed in some of the ribs to provide for film cooling to selected surfaces of the thermal skin.

DETAILED DESCRIPTION OF THE INVENTION

Figure 1:
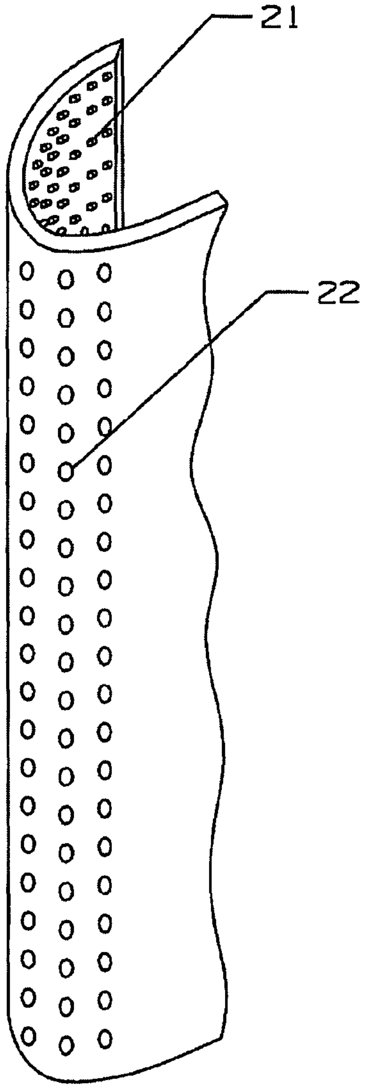
FIG. 1 shows a cross sectional top view of the turbine blade of the present invention.

The turbine rotor blade of the present invention is shown in FIG. 1 in a cross section view looking from the tip and along the spanwise direction of the blade. The rotor blade is a composite rotor blade 10 with a thin thermal skin 11 bonded to a main support spar 12. The main support spar 11 forms the entire blade except for the airfoil surface which is formed by the thin thermal skin 11. The main support spar 12 includes the blade root that has the fir tree configuration in which the blade is inserted into a slot formed within the rotor disk. The main support spar 12 also includes the internal cooling passages to supply the cooling air for convection cooling, impingement cooling and even film cooling if desired.

The main support spar 12 includes a cooling air supply cavity 13 formed adjacent to a leading edge region of the blade, and forms a series of spent air collector chambers 14 extending along the chordwise direction of the airfoil from the cooling air supply cavity 13 to the trailing edge region as seen in FIG. 1. The last spent air collector chamber 14 is connected to a row of exit cooling holes 15 formed along the trailing edge region. The main support spar 12 also includes an arrangement of ribs 16 extending outward from the chordwise axis to form impingement chambers spaced along the pressure side and the suction side of the airfoil. Ribs 16 also extend from the main support spar on the leading edge region to form a leading edge impingement chamber 17. A row of metering and impingement holes 18 are formed in the main support spar in the cooling air supply cavity 13 to discharge pressurized cooling air against the backside surface of the thin thermal skin 11. Ribs 16 extending from the cooling air supply cavity 13 form a series of impingement chambers 17 and collector chamber 14 along the two sides of the airfoil with impingement holes 19 aligned to direct impingement cooling air onto the backside wall of the thermal skin 11 and then into the collector chamber 14. The main support structure is formed from the arrangement of ribs that from the cooling air supply cavity, the impingement chambers and the collector chambers in which the ribs form an outline of an airfoil so that when the thin thermal skin is bonded to the spar, the thermal skin takes the shape of the airfoil.

Figure 4:
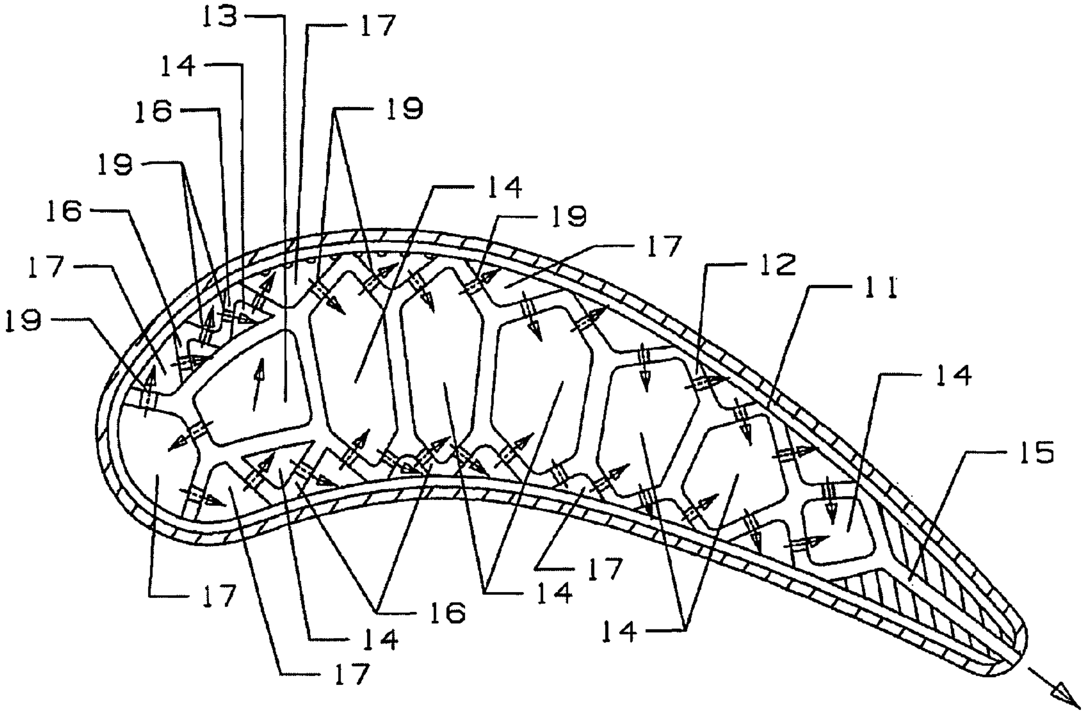
FIG. 4 shows a schematic view of the turbine blade of the present invention with several spanwise arranged rows of impingement chambers with impingement holes.

The ribs form a basic zigzag pattern such that inward facing impingement chambers and outward facing impingement chambers are formed along the airfoil sides in an alternating manner along the cooling air supply cavity 13. Along the airfoil in which the ribs form the spent air collector chambers, the ribs form the outward facing impingement chambers and the walls of the spent air collector chambers as seen in FIG. 1. Metering and impingement cooling holes 19 are formed in the ribs 16 to direct the flow of cooling air to produce impingement cooling of the main support spar or the thin thermal skin 11. The metering and impingement holes 19 are sized to produce the desired cooling air flow and pressure along the respective sides of the airfoil. The impingement cooling chambers formed along the pressure side and suction side of the airfoil are connected in series such that the cooling air will flow from the leading edge impingement chamber 17 and then be divided up into a pressure side flow and a suction side flow. The cooling air for the pressure side flow will flow into the first impingement chamber along the pressure side, and then into the next impingement chamber and repeat this series until the spent cooling air flows into the last collector chamber 14 along the trailing edge and through the trailing edge exit cooling holes 15. A similar cooling air flow path occurs on the suction side of the airfoil. As seen in FIG. 4, the impingement chambers 17 extend along the spar in the spanwise direction from the root or platform to the blade tip to form one continuous chamber with the impingement holes 19 opening into the chambers 17. In another embodiment, the spanwise impingement chambers 17 can be segmented along spanwise direction in order to separate one segment from another so that different pressures can be used based on the metering and impingement hole sizes.

Figure 2:
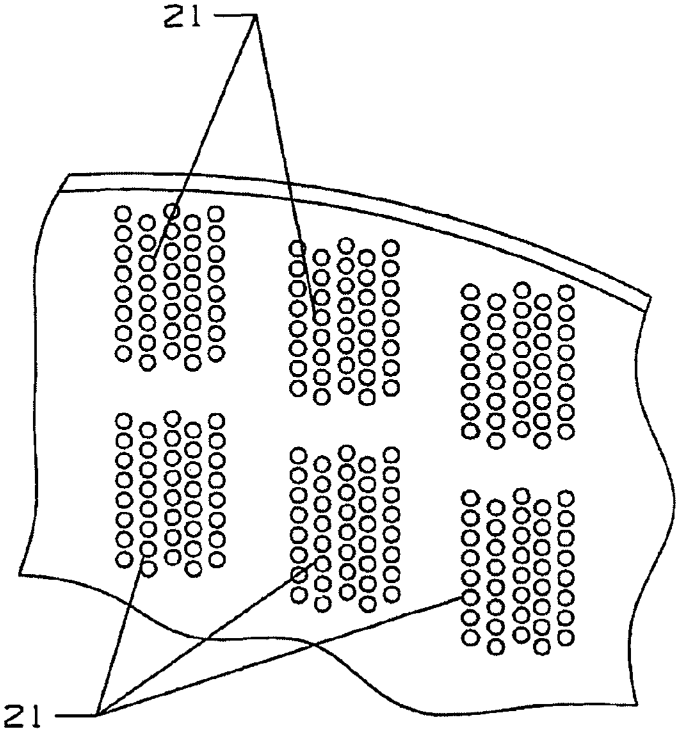
FIG. 2 shows a schematic view of a leading edge portion of the thin thermal skin of the present invention.
Figure 3:
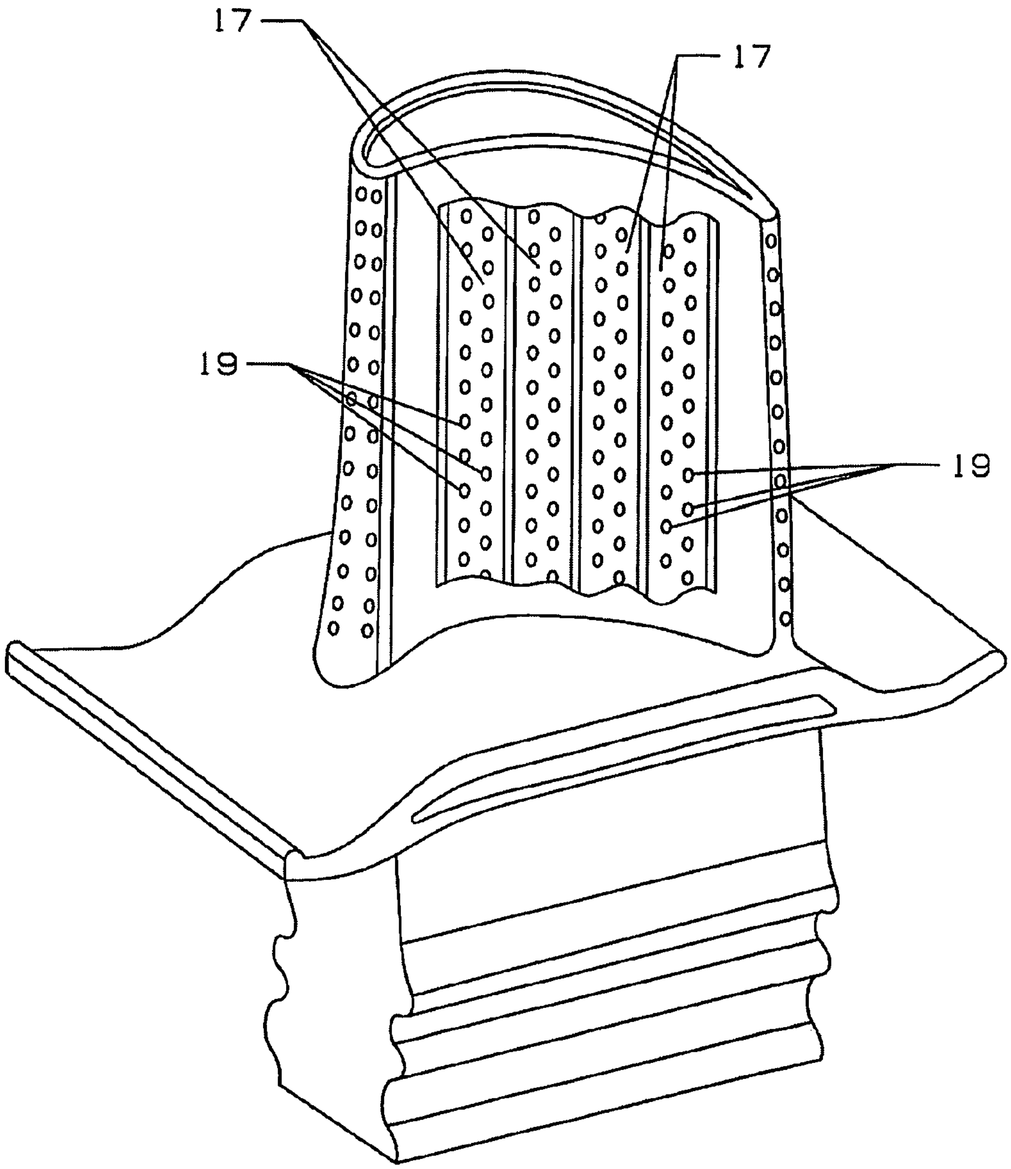
FIG. 3 shows a backside view of the thin thermal skin with the arrays of micro pin fins.

The thin thermal skin 11 is bonded to the main support spar to form the enclosed impingement chambers 17 extending along the airfoil sides and around the leading edge of the airfoil. The skin of the airfoil of the blade can be formed from one piece or from a number of pieces bonded to the spar to form the entire airfoil surface. FIG. 2 shows a view of the leading edge section of the thermal skin with an array of micro pin fins formed on the inner surface of the thermal skin 11 and an arrangement of shower film cooling holes 22. FIG. 3 shows a more detailed view of the micro pin fins 21 formed along the inner surface of the thermal skin 11 on the pressure side wall of the airfoil.

The main support spar is formed as a single piece preferably using the investment casting process or a metallic material depositing (printing) process with the impingement holes 16 and 17 formed during the manufacturing process. However, the arrangement of the ribs allow for the impingement holes to be formed into the ribs after the manufacture process using any well known hole forming technique such as EDM or laser drilling. Or, in the case of the metal depositing process (printing), the film holes can be formed during the metal depositing process as the entire airfoil is being manufactured. The thin thermal skin 11 can be formed from the same material as the main support spar 12 to better match the thermal gradients, or from a different material such as a high temperature alloy that cannot be cast or machined into the required shape. For example, Molybdenum or Tungsten are two very high temperature resistant materials, but cannot be cast or machined.

The thin thermal skin 11 is bonded or deposited (formed during the printing process of the airfoil) to the main support spar 12 using a transient liquid phase (TLP) bonding process. The thermal skin 11 can be a high temperature resistant material in a thin sheet metal form with the micro pin fins formed by photo etching or chemical etching process. The thermal skin 11 has a thickness of around 0.010 inches to 0.030 inches to allow for very effective near-wall cooling. The micro pin fins have a diameter and a height of approximately the same order as the thickness of the thermal skin 11. The density for the micro pin fins arrangement is around 50% to 75%. A low conductivity TBC material can be, secured to the outer surface of the thermal skin 11 to provide additional thermal protection for a further reduction of heat flux onto the airfoil external wall.

In the process of "printing" the spar and shell airfoil, the metal depositing process using the Mikro Systems, Inc. (of Charlottesville, Va.) process to print the metal airfoil can be used to print the spar from one material and then print the thin shell or thermal skin to the spar, to form the shell from a different material than that of the spar. The Mikro Systems process is a process to "print" metallic or ceramic parts using one or more materials to produce a single piece structure but with very fine details that cannot be cast using the investment casting process. Also, the Mikro Systems process can be used to form a multiple material part as a single piece by printing a first layer with one material and then a second layer of a different material, on top of the first layer. The process is similar to the SLA process in which the material is deposited onto a substrate and then melted by a laser to bond to the substrate. In the embodiment here, the spar can be formed by the Mikro Systems process or cast by another process, and then a thin thermal skin or shell formed over the spar to produce the airfoil portion of the blade or vane but with the shell or skin made from a different material than the spar while producing the blade or vane as a single piece.

The Mikro Systems process can also be used to "print" a TBC onto the thin thermal skin or shell by printing the metallic skin or shell and then "printing" the ceramic TBC onto the metallic skin or shell. Because of this "printing" process, the transition zone between the metallic skin or shell and the ceramic TBC can gradually change from 100% metal to 100% ceramic in order to provide a strain relief between the metal shell or skin and the ceramic TBC due to thermal stress induced from temperature differences.

In operation, pressurized cooling air is supplied to the cooling air supply cavity 13, which then flows through the metering and impingement holes and into the leading edge impingement chamber 17 to provide backside cooling for the thermal skin on the leading edge. Some of the impingement cooling air then will flow out the showerhead arrangement of film cooling holes while the remaining cooling air will flow into the first impingement chamber on the pressure and the suction sides through the metering and impingement holes 19 to provide impingement cooling to the backside surface of the thermal skin over that particular impingement chamber 17. The metering and impingement holes 19 are sized to produce a desired amount of cooling air flow and pressure into the series of passages on both sides of the airfoil. The cooling air, for example, on the pressure side wall will flow through the series of holes 19 and chambers 17 formed along the pressure side to produce impingement cooling of the thermal skin and then the spar in the leading edge region where the cooling air supply cavity 13 is located. The cooling air then flows through holes and into the spent air collector chambers 14 to form a series of cooling air flow in which impingement cooling of the thermal skin is followed by discharge into the spent air collector cavity, then impingement cooling of the thermal skin in the next chamber with discharge into the next collector cavity until the cooling air flows into the last collector cavity 14 positioned along the trailing edge region. The cooling air that impinges onto the backside wall of the thermal skin then flows into the next impingement chamber or spent cooling air collector and is diffused before passing through the next metering and impingement hole in the series of flow. The cooling air flows from the last collector chamber 14 through the row of exit holes 15 located along the trailing edge of the airfoil to be discharged from the cooling circuit of the blade.

Figure 5:
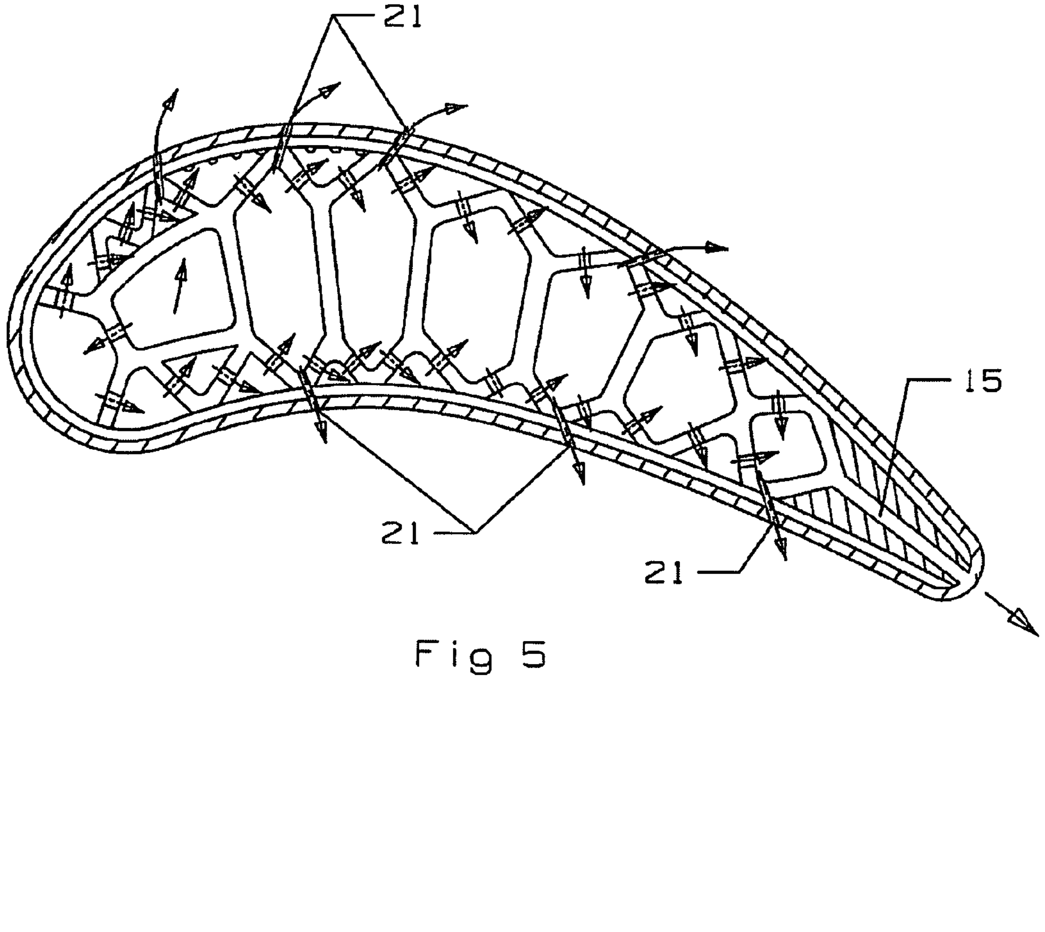
FIG. 5 shows a cross sectional top view of a second embodiment of the turbine blade of the present invention that includes film cooling holes.

FIG. 5 shows a second embodiment of the turbine blade of the present invention, and is the same as in the FIG. 1 embodiment with the addition of film cooling holes located on the pressure side wall or the suction side wall of the airfoil. The film cooling holes 21 are formed in the ribs 16 that define the impingement chambers 17 and connect the spent cooling air collector chambers to the outer airfoil surface. In the forward most film cooling holes, because of the location of the air supply cavity the film cooling holes are connected to the impingement chamber 17 as seen in FIG. 5. Film cooling holes for the airfoil side walls can be connected directly to the collector cavities or to the impingement chambers.

The present invention provides for a turbine blade with near wall cooling with the use of a thin thermal skin and multiple diffusion cavities in conjunction with multiple metering and impingement cooling for the main airfoil support body. Micro pin fins are utilized on the back side of the thermal skin for the enhancement of convection cooling. The multiple metering and impingement diffusion cavity cooling design is constructed in small individual spanwise extending chambers along the airfoil pressure and suction side surfaces. By regulating the impingement pressure ratio across the metering holes, each individual chamber can be designed based on the airfoil gas side pressure distribution in both chordwise and spanwise directions. Also, each individual chamber can be designed based on the airfoil local external heat load to achieve a desired local metal temperature. The cooling design of the present invention will maximize the usage of cooling air for a given airfoil inlet gas temperature and pressure profile. And, the multi-metering and diffusion cooling construction utilizes the multiple hole impingement cooling process for the backside convective cooling as well as flow metering in which the spent cooling air can be discharged onto the airfoil surface to form a multi-hole transpiration film cooling array at very high film coverage or the spent cooling air can be discharged into the mid-section spent cooling air collector for the continuation of multiple impingement cooling for the downstream surface of the airfoil. The combination effects of multiple hole impingement cooling on the backside of the thermal skin with heat transfer enhanced micro pin fins and, in some cases with multiple rows of film cooling holes, yields a very high cooling effectiveness and a uniform temperature for the airfoil wall.

I claim the following:

1. A turbine rotor blade comprising:
   - a main support spar forming a support structure for the blade;
   - the blade having an airfoil extending from a platform and an attachment section;
   - the main support spar formed from a plurality of ribs that define a cooling air supply cavity in a leading edge region of the airfoil, a plurality of impingement chambers spaced along the pressure side and the suction side of the airfoil, and a plurality of spent cooling air chambers spaced along the pressure side and the suction side of the airfoil; and,
   - the plurality of impingement chambers and spent cooling air chambers are arranged together in series such that cooling air flowing into an impingement chamber then flows into a collector chamber and then into another impingement chamber.

2. The turbine rotor blade of claim 1, and further comprising:
   - a leading edge impingement chamber located at a leading edge of the airfoil; and,
   - a metering and impingement hole connecting the leading edge impingement chamber to the cooling air supply chamber.

3. The turbine rotor blade of claim 2, and further comprising:
   - a first metering and impingement hole connecting the leading edge impingement chamber to the series of impingement chambers and collector chamber positioned along the suction side of the airfoil; and,
   - a second metering and impingement hole connecting the leading edge impingement chamber to the series of impingement chambers and collector chamber positioned along the pressure side of the airfoil.

4. The turbine rotor blade of claim 3, and further comprising:
   - the collector chambers located aft of the cooling air supply cavity extend from the pressure side wall to the suction side wall to form a series of collector chambers extending from the cooling air supply cavity to a trailing edge region of the airfoil.

5. The turbine rotor blade of claim 4, and further comprising:
   - a row of exit cooling holes in the trailing edge of the airfoil connected to the collector chamber located adjacent to the trailing edge region of the airfoil.

6. The turbine rotor blade of claim 1, and further comprising:
   - a thin thermal skin bonded to the main support spar to form an outer airfoil surface of the rotor blade.

7. The turbine rotor blade of claim 6, and further comprising:
   - the thin thermal skin includes a plurality of micro pin fins on the backside wall.

8. The turbine rotor blade of claim 7, and further comprising:
   - the thermal skin has a thickness of 0.010 inches to 0.030 inches; and,
   - the micro pin fins have a diameter to height ratio about equal to the thickness of the thermal skin.

9. The turbine rotor blade of claim 6, and further comprising:
   - the thermal skin has a thickness of 0.010 inches to 0.030 inches.

10. The turbine rotor blade of claim 8, and further comprising:
    - the micro pin fins have a density of from 50% to 75%.

11. The turbine rotor blade of claim 6, and further comprising:
    - a TBC applied to the thermal skin.

12. The turbine rotor blade of claim 1, and further comprising:
    - the main support spar is formed as a single piece by a metal depositing process.

13. The turbine rotor blade of claim 2, and further comprising:

the series of impingement chambers and collector chambers form a closed cooling air path from the leading edge impingement chamber to the collector chamber positioned adjacent to the trailing edge region of the airfoil.

14. The turbine rotor blade of claim 2, and further comprising:

the series of impingement chambers and collector chambers form a cooling air path from the leading edge impingement chamber to the collector chamber positioned adjacent to the trailing edge region of the airfoil; and, a first row of film cooling holes opening onto the suction side wall of the airfoil and connected to one of the collector chambers; and, a second row of film cooling holes opening onto the pressure side wall of the airfoil and connected to another one of the collector chambers.

15. The turbine rotor blade of claim 14, and further comprising:

a third row of film cooling holes opening onto the suction side wall of the airfoil and connected to the same collector chamber as the second row of film cooling holes.

16. The turbine rotor blade of claim 2, and further comprising:

the ribs include metering and impingement holes to discharge cooling air into the impingement chambers and spent air holes to discharge cooling air from the impingement chambers into the collector chambers.

17. The turbine rotor blade of claim 1, and further comprising:

the impingement chambers and the collector chambers extend along the entire airfoil surface in the spanwise direction of the rotor blade.

18. The turbine rotor blade of claim 6, and further comprising:

the thin thermal skin is formed with the spar as a single piece.

19. The turbine rotor blade of claim 18, and further comprising:

the thin thermal skin is formed from a different material than the spar.

20. The turbine rotor blade of claim 19, and further comprising:

the spar and the thin thermal skin are formed by a metal depositing process.

21. The turbine rotor blade of claim 19, and further comprising:

a TBC is formed on the thin thermal skin.

22. The turbine rotor blade of claim 21, and further comprising:

the TBC and the thin thermal skin are formed by a metal depositing process in which the metallic material gradually changes into the ceramic material of the TBC.

* * * * *